United States Patent

Hull et al.

[15] 3,706,713

[45] Dec. 19, 1972

[54] ALIPHATIC POLYCARBONATES

[72] Inventors: Colin G. Hull, San Francisco; John Boor, Jr., Cerrito, both of Calif.

[73] Assignee: Shell Oil Company, New York, N.Y.

[22] Filed: Aug. 11, 1970

[21] Appl. No.: 63,030

[52] U.S. Cl..........260/77.5 D, 260/2 BP, 260/47 EP, 260/463
[51] Int. Cl. .............................................C08g 17/13
[58] Field of Search......260/2 EP, 2 BP, 2 A, 77.5 D, 260/463, 88.3 A, 18 EP, 47 EP

[56] References Cited

UNITED STATES PATENTS

| | | | |
|---|---|---|---|
| 3,248,415 | 4/1966 | Stevens | 260/77.5 |
| 3,313,741 | 4/1967 | Uelzmann | 260/88.3 |
| 3,466,251 | 9/1969 | Fukui et al. | 260/47 |
| 3,585,168 | 6/1971 | Inoue et al. | 260/77.5 D |

*Primary Examiner*—William H. Short
*Assistant Examiner*—T. Pertilla
*Attorney*—Norris E. Faringer and Martin S. Baer

[57] ABSTRACT

Compositions comprising novel copolymers of carbon dioxide and one or more aliphatic 1,2 monoepoxide having at least four carbon atoms per molecule are prepared in the presence of a catalytic amount of a catalyst system comprising an organo metallic compound of magnesium, zinc or cadmium, an amine and water at pressures between 1 and 200 atmospheres and temperatures between 20° and 225° C. The compositions are useful for moldings, films and fibers.

3 Claims, No Drawings

ALIPHATIC POLYCARBONATES

This invention relates to novel copolymers of carbon dioxide and aliphatic epoxides having at least four carbon atoms.

It is known that aliphatic polycarbonates may be prepared by the reaction of dihydroxy compounds with phosgene, bis chlorocarbonates or bis chloroformates; also by transesterification, and by polymerization of cyclocarbonates. It is also known that carbon dioxide may be polymerized with aliphatic epoxides having at most three carbon atoms. However, these aliphatic polycarbonates have not achieved technical importance in the area of films, fibers or thermoplastics owing to deficiencies in one or more of the following: low molecular weight, low melting points, low glass transition temperature, and often inadequate thermal stability.

It has now been found that compositions comprising a novel high molecular weight, linear, substantially alternating copolymer of carbon dioxide and at least one aliphatic (the term aliphatic herein includes cycloaliphatic) 1,2 monoepoxide having at least four carbon atoms, have good film-forming, fiber-forming and molding characteristics. It has further been discovered that these novel copolymers may be prepared by a process which comprises contacting substantially pure carbon dioxide with at least one aliphatic and/or cycloaliphatic 1,2 monoepoxide having at least four carbon atoms in the presence of a catalytic amount of a composite catalyst consisting of an organometallic compound of a Group II metal from the group consisting of magnesium, zinc and cadmium, an amine and water.

The novel class of copolymers according to the invention are characterized by recurring units of the following structural formula:

$$\left[\begin{matrix} R_1 & R_3 \\ -C-C- \\ R_2 & R_4 \end{matrix} \left(O-\overset{O}{\underset{\|}{C}}\right)_y O \right]$$

wherein $R_1$ and $R_3$, which may be similar or dissimilar, each denote hydrogen or a hydrocarbyl group with at most eight carbon atoms, and $R_2$ and $R_4$, which may be similar or dissimilar, each denote hydrogen, a hydrocarbyl or phenoxy group having at most eight carbon atoms, or, together with the carbon atoms to which they are attached, constitute a carbocyclic ring of from four to seven carbon atoms, which ring may be substituted with an alkyl group of at most five carbon atoms; and $R_1$, $R_2$, $R_3$, and $R_4$ together have at least two carbon atoms; and $y$ is 0 or 1, and $y$ is 1 in from about 25 to 99 percent of the recurring units.

A preferred group of the new copolymers may be illustrated by those having recurring structural units of the formula:

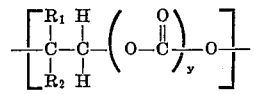

wherein $R_1$ is a hydrocarbyl group having at most eight carbon atoms and $R_2$ denotes hydrogen, a hydrocarbyl or phenoxy group having at most eight carbon atoms, $R_1$ and $R_2$ together have at least two carbon atoms, $y$ is 0 or 1, and $y$ is 1 in from about 25 to 99 percent of the recurring units.

A particularly preferred group of the new copolymers include those having recurring structural units of the formula:

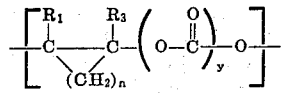

wherein $R_1$ and $R_3$, which may be similar or dissimilar, are each hydrogen, methyl or ethyl, and $n$ is an integer from 2 to 5, $y$ is 0 or 1, and is 1 in from about 25 to 99 percent of the recurring units.

Representative examples of these compounds include:
Poly (butene carbonate)
Poly (isobutylene carbonate)
Poly (isopentene carbonate)
Poly (cyclopentene carbonate)
Poly (cyclohexene carbonate)
Poly (phenoxypropylene carbonate)
Poly (cycloheptene carbonate)
Poly (ethylphenoxypropylene carbonate)
Poly (octene carbonate)

The polycarbonates are most conveniently prepared by reacting the corresponding aliphatic or cycloaliphatic monoxirane compounds with carbon dioxide, suitably at a temperature below 225°C.

Preferably, temperatures below 200°C, in particular below 150°C, may be used for the purpose. The optimum temperature range depends upon the catalyst used. If an organo metallic compound of zinc or cadmium having at most 12 carbon atoms is employed, temperatures below 150°C are preferred.

The aliphatic and cycloaliphatic monoepoxide monomers employed in preparing the novel copolymers according to the invention preferably have from four to 20 carbon atoms, those 1,2 epoxides containing from five to about 12 carbon atoms being particularly preferred.

The preparation of 1,2-epoxides from the corresponding olefin generally may be accomplished either by dehydrohalogenation of the appropriate halohydrin, or by epoxidation of the olefin, e.g., with an organic peracid or a hydroperoxide, according to known procedures. Suitable 1,2-monoepoxides include: isobutylene oxide, 1-butene oxide, 2-butene oxide, trimethylethylene oxide, tetramethylethylene oxide, 1,1-diphenylethylene oxide, cyclopentene epoxide, cyclohexene epoxide, phenyl glycidyl ether, dihydronaphthalene epoxide, dodecene epoxide and 3-methylcyclopentene epoxide.

The carbon dioxide employed in preparing the copolymer compositions according to the invention is preferably free of active impurities, but may contain substantial amounts of inert gases such as nitrogen, argon and the like.

The organo metallic compounds of a Group II metal which can be used as a catalyst component for the preparation of aliphatic (which term here includes cycloaliphatic) polycarbonates in accordance with the invention can be characterized by the following formula:

Y — M — Y wherein M represents a Group II metal in the Periodic Table, i.e., from the group of magnesium, zinc or cadmium, wherein Y, which may be similar or dissimilar, represents a monovalent hydrocarbon radical, hydrocarbyloxy or halogen radical. Zinc and cadmium are preferred.

The monovalent hydrocarbon radicals are of any type including aliphatic, aromatic and alicyclic radicals as exemplified by alkyl, cycloalkyl, aryl, alkaryl and the like. Illustrative hydrocarbon radicals include, for instance, methyl, ethyl, isopropyl, n-propyl, n-butyl, t-butyl, isobutyl, sec-butyl, amyl, hexyl, isohexyl, 2-ethylhexyl, 3-methylheptyl, the octyls, the decyls, the dodecyls, the octadecyls, cyclopentyl, cyclohexyl, cycloheptyl, 2-methylcyclopentyl, 2-butylcyclohexyl, 3-methylcycloheptyl, benzyl, phenylpropyl, trimethylphenyl, and the like. Exemplary hydrocarbyloxy radicals include, for example, alkoxy, aryloxy, cycloalkyloxy, and the like, e.g., methoxy, ethoxy, isopropoxy, n-propoxy, n-butyoxy, t-butoxy, hexoxy, 2-ethylhexoxy, octoxy, decoxy, dodecoxy, phenoxy, butylphenoxy, benzyloxy, cyclohexloxy, and the like.

Exemplary halogens are chlorine and bromine or iodine.

The amine component is selected from the group of primary, secondary and tertiary amines, and includes heterocyclic compounds containing nitrogen in the ring. Exemplary amines include: aliphatic, cycloaliphatic, aliphatic-aromatic and aromatic amines, for example, alkylamines, alkenylamines, e.g., allylamine, diallylamine, triallylamine and methallylamine, alkylenediamines, alkylene polyamines, and their derivatives such as oxyalkylamines and amino acids, cyclohexylamine, dicyclohexylamine, benzylamine, phenylisopropylamine, aniline, toluidines, diphenylamine, methylaniline and N,N-dimethylaniline. The third component of the catalyst system is water.

The mole ratio of the components of the composite catalyst may vary within wide limits depending to some extent upon the selected organo metallic compound, the particular amine, the 1,2-monoepoxide to be copolymerized, the diluent, if any, and the selected reaction temperature. Generally, the mole ratio is in the range of 0.01 to 3.0 moles of water per mole of amine and which combination is in the range of 0.01 to 2 preferably 0.1 to 1.4 moles per mole of organo metallic compound. The sequence of mixing is not critical; however, it is generally preferred first to combine the water and amine component, which combination is then mixed with organo metallic compound. Omission of the amine component results in only slight catalytic activity, producing very low molecular weight copolymers after lengthy duration.

The catalysts are employed in catalytically significant quantities. The particular epoxide monomer or monomers employed, the operative conditions under which the copolymerization is conducted, and other factors will largely determine the desired catalyst concentration. In general, a catalyst concentration in the range of from about 0.001 and lower to about 10 percent by weight based upon the monomeric feed is suitable. A catalyst concentration in the range of from about 0.01 to about 5.0 percent by weight is preferred.

The polymerization reaction can be conducted over a wide temperature range. Depending upon various factors such as the nature of the particular aliphatic monoepoxides employed, the particular catalyst employed, the concentrations of the catalyst and the like, the reaction temperature can be as low as −20°C and as high as about 200°C. A reaction temperature in the range from 0° to 150°C is preferred. Reaction pressures suitably vary within wide limits, e.g., from atmospheric pressure and below to 200 atmospheres or higher.

The copolymerization reaction may be carried out in the presence of an inert normally liquid organic vehicle. Suitable inert solvents for the preparation of the polycarbonates are, for example, hydrocarbons including aliphatic, cycloaliphatic hydrocarbons such as n-hexane, cyclohexane, n-heptane, petroleum ether, and the like, aromatic hydrocarbons such as benzene, toluene, and the like, oxygen-containing solvents, particularly ethers, such as dioxane, diethyl ether, diisopropyl-ether and the like, halogenated hydrocarbons such as chloroform, carbon tetrachloride, chlorobenzene, and mixtures thereof.

The process of the invention can be executed in a batch, semicontinuous or continuous fashion.

It is a particular advantage of the process according to the invention that when employing monomeric cycloaliphatic epoxides that the resulting polycarbonates often possess stereoregularity in the trans position. It should be noted that trans isomers generally possess higher melting points than the corresponding cis isomers. Various additives which are inert towards the polymerization mixture can be incorporated in the monomeric epoxide(s). Examples of such additives are pigments, dyes, fillers, antioxidants, antistatic agents and the like. As plasticizers small amounts (up to 20 percent weight, preferably up to 10 percent weight) of ethylene oxide and/or propylene oxide may be included.

The ultimate molecular weight and properties of the aliphatic polycarbonates will depend in the main on the selected monoepoxide(s), catalyst and reaction conditions. The new aliphatic polycarbonates vary from a tough amorphous material to crystalline polymers. The intrinsic viscosity of the new substantially linear copolymers will vary from at least about 0.1 to 5.0 dl/g and higher as measured in ortho-dichlorobenzene at 150°C. The molecular weights of the polycarbonate products can range from about 200,000 to several hundred thousand, e.g., 500,000 and higher. High molecular weight polycarbonates having said intrinsic viscosity of at least about 0.2 dl/g are preferred. It has generally been found that many of the new copolymers obtained from acyclic olefin monoepoxides tend to have less crystallinity and less definite melting range. However, near the glass transition temperature they soften and undergo plastic deformation under stress. It is a particular advantage that the new copolymers have considerably higher glass transition temperature as compared, e.g., with corresponding polymers prepared in the absence of carbon dioxide. Higher glass transition temperature of a moldable polymer enables higher mold temperatures enabling greater production speeds and reduced mold release problems. Additionally, the carbonate moiety enhances the solubility of the polymer in many solvents. Accordingly, it will be seen that by controlling reaction conditions, the amount of inchain carbonate groups, i.e., linkages, within the resulting product may be varied from about 25 to about 99 percent and more of the total linkages corresponding to 25 to 99 percent w poly carbonate (the remaining linkages being linear ether groups) to achieve the desired balance of properties. Polymers of more than 55 percent polycarbonate, especially above 75 percent, are preferred.

The new copolymers derived from cyclic monoepoxides are as a rule more crystalline with a more definite melting range.

The 1,2 polycarbonates according to the invention may be useful thermoplastics which can be shaped by known methods such as, for example, melt spinning, extrusion, injection molding and blow molding into, e.g., fibers, films, sheets, profiles, solid moldings, bottles, toys and the like.

Foam may be produced from the copolymer compositions according to the invention employing techniques such as mixing an inert solvent, e.g., aliphatic or cycloaliphatic hydrocarbon as inert gas with the molten polymer under pressure, and allowing the mixture to cool under pressure. Subsequent heating to an elevated temperature, e.g., 150°C results in a low density foamed material.

Various additives can be incorporated into the compositions according to the invention. Examples of such additives in addition to those hereinbefore described include stabilizers against heat and ultraviolet lights such as silicates of lead and zinc, organic tin compounds, aryl tin oxides, and the like.

It is also possible to physically blend the polycarbonates according to the inventions with other thermoplastic materials such as polyethers, polyesters, polyolefins and the like, which blended compositions have improved fire retardancy owing to the release of carbon dioxide gas by the polycarbonate.

In the following examples, all volumetric amounts are at room temperature, i.e., about 23°C, and "percents" are based upon weight unless otherwise specified.

EXAMPLE I

A stainless steel reaction vessel, equipped with a mechanical stirrer and having a capacity of 80 ml, was dried at 130°C and purged with dry nitrogen. Toluene (25 ml), a solution of 14 mmole (millimole) of diethyl zinc in 9 ml of heptane and 0.45 ml of a premixture of cyclohexylamine and water in a ratio of 0.7 mole of amine to 1.0 mole of water were therein mixed for 2 hours at 25°C. Twenty ml of isobutylene oxide were added and the vessel was charged with carbon dioxide to a pressure of 800 psig and stirred at room temperature for 1 hour. The vessel was then repressured with carbon dioxide to 800 psig and heated to 65°C for about 16 hours. The final pressure on the vessel was about 910 psig. The resulting copolymer product was precipitated into methanol containing concentrated hydrochloric acid, agitated to effect catalyst removal, rinsed with additional methanol and finally dried under vacuum at a temperature of 60°C. The purified white solid, which had an intrinsic viscosity of 0.66 dl/g in ortho-dichlorobenzene at 150°C, was obtained in about 11.5 percent yield. It was pressed into strong clear films. X-ray examination indicated that very little crystallinity was present. The polymer exhibited a glass transition temperature of 48°C. Elemental analysis showed the polymer was 41.3 percent carbon, 7.2 percent hydrogen and 41.2 percent oxygen. Nuclear magnetic resonance spectrum of a solution of 10 percent of the polymer in ortho-dichlorobenzene at 150°C showed strong absorption for the carbonate moiety. The replacement of the ether linkages in the polymer chain by carbonate groups causes a significant downfield shift in the position of the $-CH_2$ and $CH_3$ resonances. By integration of the peak areas in the NMR spectrum, the polymer was found to contain about 93 percent carbonate units, the remainder being polyether units.

By way of comparison, a polymer of isobutylene oxide similarly prepared, but omitting the carbon dioxide, had a glass transition temperature of −20°C and had a calculated elemental analysis of 66.6 percent carbon, 11.2 percent hydrogen and 22.2 percent oxygen.

EXAMPLE II

The procedure of Example I was repeated except that the catalyst system was added but a few minutes prior to adding the monomer, the isobutylene oxide was replaced with 15 grams of cyclohexene-1,2-epoxide, the carbon dioxide was provided from a source to maintain a constant pressure of 750 psig, and the vessel was heated to 100°C for about 18 hours. The resulting copolymer was worked up as above providing a purified white free-flowing powder in about 81 percent yield on the epoxide monomer which had an inherent viscosity of 1.37 in toluene at 25°C at a concentration of 0.34 grams per 100 ml. X-ray examination showed the copolymer had greater than 50 percent crystallinity. It was molded into clear bars. The copolymer exhibited a glass transition temperature of about 90°C and had a Rockwell R hardness of 109. NMR spectra of the polymer in benzene solution showed the polymer to contain about 96 ± 3 percent carbonate units, the remainder being linear polyether units. Carbon-hydrogen analysis showed the polymer was greater than 98 percent carbonate. By comparison with known trans-configured polyether materials, the copolymer was found to be stereo regular in the trans position. The molecular weight distribution was broad (0.5–1 million).

EXAMPLE III

The procedure of Example II is repeated except that the cyclohexyl amine is replaced with t-butylamine, cyclopentylamine, isopropylamine piperidine or benzylamine. Related results are obtained.

EXAMPLE IV

The procedure of Example II was repeated except that the cyclohexene-1,2-epoxide was replaced with a mixture of 8 grams each of cyclohexene-1,2-epoxide and cyclopentene-1,2-epoxide. The product was worked up as above to obtain 13.8 grams of copolymer having an inherent viscosity of 0.22 dl/g in toluene at .3 grams per 100 ml at 25°C. NMR spectrum showed the copolymer was about 87 percent carbonate, the remainder being linear polyether units. X-ray examination showed the polymer to have equal to or greater

EXAMPLE V

A stainless steel reaction vessel, equipped with a mechanical stirrer and having a capacity of 300 ml, was dried at 130°C, purged with dry nitrogen, and was charged with 75 ml of toluene, 1.35 ml of mixture of cyclohexylamine and water in a mole ratio of 0.7 to 1.0, 42 millimoles of zinc diethyl, 27 ml of heptane and 62.8 grams of cyclopentane 1,2 epoxide. The vessel was charged with carbon dioxide from a source to maintain a constant pressure of 50 atmospheres gauge and the vessel was heated to 65°C for 22 hours. The product was removed and purified according to the procedure of Example I, resulting in 20.9 grams of copolymer having an inherent viscosity of 1.35 in toluene at 25°C at a concentration of 0.3 grams per 100 ml. The crystalline copolymer had a melting point of about 225°C and was molded into shaped articles. A molded bar of the copolymer was extracted with toluene and the solvent removed. Carbon and oxygen analysis of the extracted portion showed the copolymer to contain about 96 percent $w$ carbonate units. A weighed portion of the extracted materials was placed on a gold pan of a balance and was heated at the rate of 2.1°C min. in a stream of air flowing at 50 milliliters per minute. The copolymer exhibited 1 percent weight loss at 229°C and 10 percent weight loss at 259°C. The copolymer had a Rockwell R hardness of 111, an Izod impact strength of 0.31 foot pounds per inch of notch, and a glass transition temperature of 80°C.

EXAMPLE VI

The procedure of Example V is repeated except that the diethyl zinc is replaced with like amounts of magnesium ethoxy ethyl, magnesium ethyl bromide and cadmium diethyl. Related results are obtained.

We claim as our invention:

1. A process for preparing a copolymer which comprises contacting carbon dioxide free from active impurities with at least one monomer from the group consisting of aliphatic and cycloaliphatic 1,2 monoepoxides of at least four carbon atoms in the presence of from about 0.01 to about 5 percent by weight on the monomer of a composite catalyst consisting essentially of an organometallic compound of the formula Y—M—Y wherein M represents magnesium, zinc or cadmium and Y, which may be similar or dissimilar, represents a monovalent hydrocarbon radical, hydrocarbyloxy or halogen radical; an amine and water; in a mole ratio of 0.01 to 3.0 moles of water per mole of amine and which combination is in the range of 0.01 to 2 moles per mole of organometallic compound.

2. A process according to claim 1 wherein the organo metallic compound is of zinc.

3. A process according to claim 1 wherein the pressure is between 1 and 200 atmospheres.

* * * * *